(12) United States Patent
D'souza

(10) Patent No.: US 12,155,683 B2
(45) Date of Patent: Nov. 26, 2024

(54) SYSTEM AND METHOD TO MANAGE SECURITY

(71) Applicant: Richard D'souza, Langley (CA)

(72) Inventor: Richard D'souza, Langley (CA)

( * ) Notice: Subject to any disclaimer, the term of this patent is extended or adjusted under 35 U.S.C. 154(b) by 320 days.

(21) Appl. No.: 17/903,015

(22) Filed: Sep. 5, 2022

(65) Prior Publication Data

US 2023/0073309 A1 Mar. 9, 2023

Related U.S. Application Data

(60) Provisional application No. 63/249,969, filed on Sep. 29, 2021.

(51) Int. Cl.
| | | |
|---|---|---|
| *G06F 21/32* | (2013.01) | |
| *G06F 21/85* | (2013.01) | |
| *H04L 9/08* | (2006.01) | |
| *H04L 9/30* | (2006.01) | |
| *H04L 9/40* | (2022.01) | |

(52) U.S. Cl.
CPC .......... *H04L 63/1425* (2013.01); *G06F 21/32* (2013.01); *G06F 21/85* (2013.01); *H04L 9/0819* (2013.01); *H04L 9/0822* (2013.01); *H04L 9/3066* (2013.01); *H04L 63/08* (2013.01); *H04L 63/1416* (2013.01); *H04L 63/1433* (2013.01); *H04L 2463/082* (2013.01)

(58) Field of Classification Search
CPC . H04L 63/1425; H04L 9/0819; H04L 9/0822; H04L 9/3066; H04L 63/08; H04L 63/1416; H04L 63/1433; H04L 2463/082; G06F 21/32; G06F 21/85
See application file for complete search history.

(56) References Cited

U.S. PATENT DOCUMENTS

| | | | |
|---|---|---|---|
| 12,001,579 B1 * | 6/2024 | Chevallier-Mames | G06F 16/1752 |
| 12,088,721 B2 * | 9/2024 | Michael | H04L 9/3242 |
| 12,089,049 B2 * | 9/2024 | Shiner | H04L 9/3247 |
| 2023/0007036 A1 * | 1/2023 | D'souza | H04L 9/3066 |
| 2023/0081399 A1 * | 3/2023 | Murphy | G06Q 10/06395 705/7.42 |
| 2023/0091179 A1 * | 3/2023 | Bari | H04L 9/3236 713/168 |
| 2023/0091318 A1 * | 3/2023 | Lindemann | H04L 63/0442 726/4 |
| 2023/0108423 A1 * | 4/2023 | Wisgo | H04L 63/108 713/165 |
| 2023/0110275 A1 * | 4/2023 | Litichever | G06F 21/82 710/62 |

(Continued)

*Primary Examiner* — Stephen T Gundry

(74) *Attorney, Agent, or Firm* — RC Trademark Company

(57) ABSTRACT

The proposed system employs one or more steps and an architectural arrangement of a plurality of relevant functional element to enable a security. A USB device is arranged to enable secure access of a computing device. A first cloud server is arranged to receive an ID, a cryptographic key, an authentication PIN and a pre-stored data from the computing device. The first cloud server encrypts the received pre-stored data using the received cryptographic key and subsequently transmits the ID, the cryptographic key and the authentication PIN, to a second cloud server. Further, the second cloud server performs a plurality of sequential functional operation, critical to the motive and objective of deploying the proposed system.

19 Claims, 3 Drawing Sheets

(56) References Cited

U.S. PATENT DOCUMENTS

2023/0412373 A1\* 12/2023 Sierra .................... H04L 9/0869
2024/0098097 A1\* 3/2024 Hinchliffe ............. H04L 63/123

\* cited by examiner

SYSTEM AND METHOD TO MANAGE SECURITY

FIELD OF THE INVENTION

The present invention relates to a system to manage and control cyber security. More specifically, the present invention relates to method and system to enable secure data communication using a specialized Universal Serial Bus (USB) device.

BACKGROUND

The background description includes information that may be useful in understanding the present invention. It is not an admission that any of the information provided herein is prior art or relevant to the presently claimed invention, or that any publication specifically or implicitly referenced is prior art.

Data that resides on a computer can typically be attacked by those who wish to steal or modify the content in a number of different ways. One of the ways that data can be attacked is through the use of "rogue" software that can, for example, reside on the host computer. Typically, rogue software can attempt to access and manipulate the data when the data is stored on the computer (such as in local memory or on the hard disk), and/or "snoop" the data when it is transferred or moved about the computer to and from data destination or origination points such as devices that are connected to the computer.

One point of software attack can be the Universal Serial Bus (USB) that connects the computer to different devices such as a keyboard, mouse, speakers and the like. As some general background on USB, consider the discussion just below. Universal Serial Bus (USB) is a standard peripheral interface for attaching personal computers to a wide variety of devices: e.g., digital telephone lines, monitors, modems, mice, printers, scanners, game controllers, keyboards, and other peripherals. USB becomes more critical when connected in a computer network as this can float malicious attack in the network. The computer networks in many organizations are continuously challenged by various security threats. Defence and government organizations with higher security networks are forced to isolate their secure networks and also well manage user authentication.

Conventional methods of access control may require particular authentication credentials from the user which can be guess or determined by hacker or subjected to malicious attack. Even though combination of authentications or levels of authentications are introduced but infection risk continues. Biometric authentication, picture password, login credentials etc. are available, however, improper user authentication may cause catastrophic results.

The proposed disclosure may render a genuine solution and an alternative to aforementioned impending issues/grievances of the prior and existent art. To amplify security and mitigate risk, proposed disclosure performs multilevel authentication based on various parameters. Also, USB enables tracking of data which is floated among various users.

SUMMARY

The present invention relates to a system to manage and control cyber security. More specifically, the present invention relates to specialized or enabled Universal Serial Bus (USB) device and other relevant apparatus/configuration which are systemically and systematically dedicated or intended to manage a security of one or more computing devices.

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

The following paragraphs provide additional support for the claims of the subject application.

In an aspect the present disclosure provides a system to manage security, the system comprising: a Universal Serial Bus (USB) security device is arranged to enable secure access of a computing device, wherein the USB security device comprises: a storage device, which is arranged to store: an identifier (ID) of the USB security device, a cryptographic key, and a personal identification number (PIN) detection circuit is arranged to receive an authentication PIN; a first cloud server is communicably coupled with the first computing device, wherein the first cloud server is arranged to: utilize a network interface to receive the ID, the cryptographic key, the authentication PIN and a pre-stored data, wherein the pre-stored data is stored in at least one of (i) the USB security device, and (ii) the computing device; encrypt the received pre-stored data using the received cryptographic key; and transmit the ID, the cryptographic key and the authentication PIN, to a second cloud server, wherein the second cloud server is operatively coupled with the first cloud server; and the second cloud server is arranged to: receive the transmitted ID, the cryptographic key and the authentication PIN; generate a dynamic encryption key; utilize, a blockchain network to link, the generated dynamic encryption key to the encrypted data to enable tracking of the encrypted data; analyse, the linked encrypted data to determine at least one Indicator of compromise (IOC); and trigger, an artificial intelligence (AI) mechanism to perform an automated incident measure management for the encrypted data.

In another aspect the present disclosure provides a method for managing security, the method comprising: detecting, an insertion of a Universal Serial Bus (USB) security device in a computing device, to enable secure access of the computing device, wherein the USB security device comprises: a storage device, which is arranged to store: an identifier (ID) of the USB security device, a cryptographic key, and a personal identification number (PIN) detection circuit is arranged to receive an authentication PIN; receiving, at a first cloud server, from the computing device, the ID, the cryptographic key and the authentication PIN to authenticate a user; performing encryption at the first cloud server of a pre-stored data, wherein the pre-stored data is received, from at least one of (i) the USB security device, and (ii) the computing device; transmitting, the ID, the cryptographic key and the authentication PIN, from the first cloud server to a second cloud server, wherein the second cloud server is operatively coupled with the first cloud server; generating, a dynamic encryption key, at the second cloud server; utilizing, a blockchain network for linking, the generated dynamic encryption key and the encrypted data to enable tracking of the encrypted data; analysing, the linked encrypted data to determine at least one Indicator of compromise (IOC); and triggering, an artificial intelligence (AI) mechanism to perform an automated incident measure management for the encrypted data.

In an embodiment, the USB security device comprising a biometric unit to receive a biometric parameter of a user for authentication.

In an embodiment, the biometric unit comprising at least one from: a microphone to receive an audio sample of user; a fingerprint scanner to receive a fingerprint of user; and a camera to receive a facial feature of the user.

In an embodiment, the received biometric parameter are used to authenticate the user to regenerate the cryptographic key.

In an embodiment, the USB security device is arranged store biometric information of authenticated user.

In an embodiment, the first cloud server is configured to destroy the cryptographic key, when the received pre-stored data is encrypted.

In an embodiment, the first cloud server is configured to destroy the cryptographic key upon categorizing the user as unauthenticated.

In an embodiment, the second cloud server is configured to destroy the dynamic encryption key, when the at least one IOC is determined.

In an embodiment, the USB security device is arranged to store a secondary key to regenerate the cryptographic key.

In an embodiment, the encryption key is destroyed, by the USB device, upon determining the USB device is beyond a safe location.

In an embodiment, a notification is triggered, by the USB device, upon determining the USB is beyond a pre-set threshold distance from the safe location.

In an embodiment, the USB security device comprises a smart card reader to receive an authentication data from a smart card.

BRIEF DESCRIPTION OF THE DRAWINGS

The features and advantages of the present disclosure would be more clearly understood from the following description taken in conjunction with the accompanying drawings in which.

DETAILED DESCRIPTION

Figure 1:
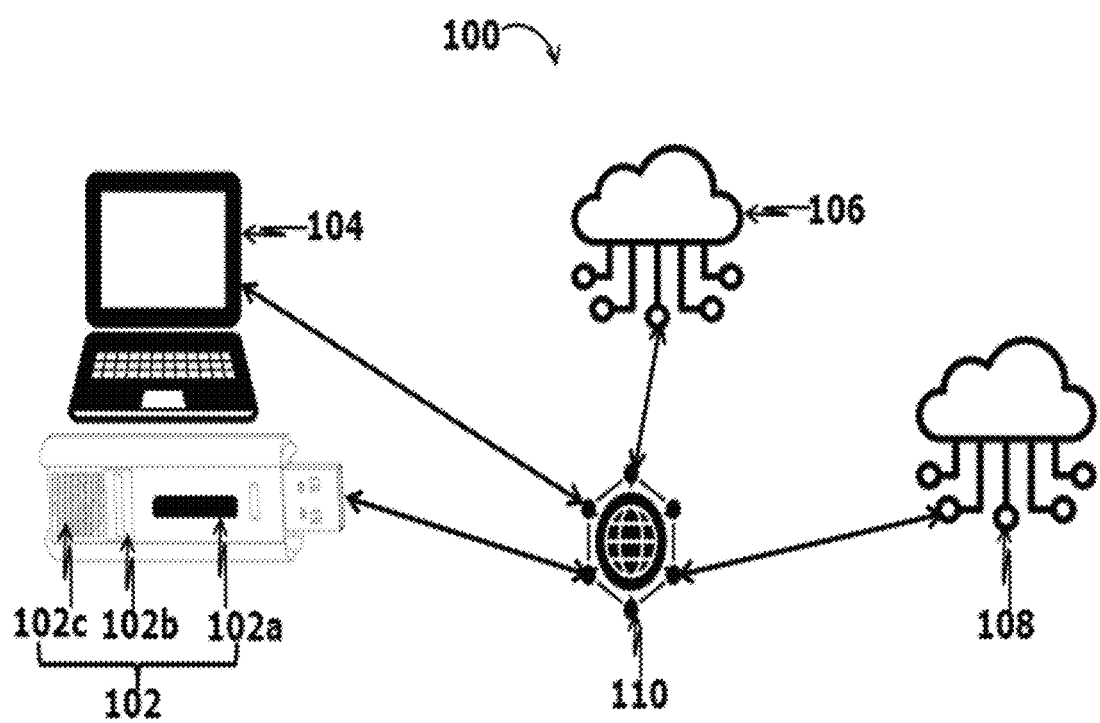
FIG. 1 illustrates an architectural paradigm of a system to manage security, in accordance with the embodiments of present disclosure.

In the following detailed description of the invention, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to claim those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The present invention relates to a system to manage and control cyber security. More specifically, the present invention relates to specialized or enabled Universal Serial Bus (USB) device and other relevant apparatus/configuration which are systemically and systematically dedicated or intended to manage a security of one or more computing devices.

According to an illustration made in FIG. 1, showcasing an architectural paradigm of a system 100 to manage security. The term "security" as used herein may relate to, but not limited to a protected, a verified, an authenticated, a validated, a foolproof, a safe, a legitimate architectural setup of a cyber environment (such as a cyber communication channel/portal/passage employed for a secure access and the like) deployed to maintain confidentiality/sanctity and integrity of a communicated data (such as transmitted or received electronic communication data) between one or more computing device 104. For instance, the system 100 may be enabled to perform encryption and decryption of a communicated data (such as a transmitted data or received data, respectively), in accordance with the embodiments of present disclosure. The system 100 may prevent or deter an illegitimate use (such as, but not limited to illegally reproducing or disseminating the communicated confidential information/data) of transmitted and received data and hence can suit one or more objective or purpose of deployment thereof.

Throughout the present disclosure, the term "computing device" and/or "electronic device" can relate to a device, including but not limited to, a cellular phone, a smart phone, a personal digital assistant (PDA), a handheld device, a wireless modem, a laptop, a mobile terminal, a user terminal, a subscriber unit, a wearable computer (a smart band, an electronic jewellery) and other known variants thereof. The computing device 104 may include a casing, a network interface card, a display and the like. The computing device 104 may be associated with an exemplary user who may be intending to access or interact.

The computing device 104 may exemplarily comprise a storage media may include volatile and non-volatile, removable and non-removable media implemented in any method or technology for storage of information, such as computer readable instructions, data structures, program modules, and the like. Non limiting examples of computer storage media can include RAM, ROM, EEPROM, flash memory, or other optical storage, magnetic disc storage or other magnetic storage devices, or other known compatible storage medium which can be used to store a desired information (such as one or more genetic information and relevant data thereof) and which can be accessed by an application, module, or both. Further, the computing device 104 may incorporate any processor-based or microprocessor-based architectural setup which may employ one or more microcontrollers; reduced instruction set computers (RISC), application specific integrated circuits (ASICs), logic circuits, and any other circuit or processor capable of executing one or more exemplary functions.

In an embodiment, the architectural paradigm of a system 100 may comprise a Universal Serial Bus (USB) security device 102, a first cloud server 106, a second cloud server 108, a network interface 110 and other known elements thereof. A person ordinarily skilled in art would prefer that one or more elements of the system 100 may be communicably or functionally interlinked with each other, over the network interface 110, in accordance with the embodiments of present disclosure. Additionally, any examples set forth during a course of detailed description cannot be intended to be restrictive or demarcating and merely set forth to epitomize possible embodiments for the claimed invention.

Referring to the preceding embodiment, the pictorial representation made in FIG. 1, can be considered as a mere depiction or a demonstration of system 100, thus cannot limit a scope of the present invention. However, to those ordinarily skilled or extra ordinarily skilled in art may prefer that one or more functional elements/embodiments included in the architectural setup of system 100, can be modified and updated, as and when necessary. One or more embodiments of the present invention may be described in detail with reference to the drawings, wherein like reference numerals can represent like elements and assemblies throughout the present disclosure.

In an embodiment, the Universal Serial Bus (USB) security device 102 can be arranged to enable a secure access (such as to protect against a tampering or other illicit access, allowing data access in term of view or editing) of the computing device 104. For instance, a portable or compatible (USB) security device 102 can be mounted by plugging to an exemplary USB port configured with the computing device 104 and can be interacted via one or more software or executable instruction or an exemplary user interface or operating interface installed/stored therein. An exemplary LED indicator configured with the USB security device 102 may light up on being plugged to the USB port of the (USB) security device 102 and may intermittently blink during a course of mounting or usage thereof.

The USB security device 102 may comprise a storage device 102*a*, wherein the storage device 102*a* (such as, not limited to a secondary or ancillary or auxiliary storage memory and the like) can be arranged to store/cache an identifier (ID), a cryptographic key, a personal identification number (PIN) detection circuit and other known critical information and component relevant to one or more objectives of deploying the system 100. The key can also be operatively coupled with aforementioned computing devices, through communication medium. The communication medium can be USB, USB-C, Micro USB, a wired communication network, a wireless communication network (Bluetooth, Wi-Fi), and the like.

Referring to the preceding embodiment, the USB security device 102 can be selected from, but not restricted to a flash drive, an external solid state drive, a pen drive and other known examples thereof. The USB security device 102 may be based on a USB standard such as USB 3.1 or 3.0 or USB 2.0 and the like. Further, USB security device 102 may comprise a smart card reader 102*c* to receive an authentication data from a smart card and a biometric unit 102*b* to receive a biometric parameter of a user for authentication, as depicted in FIG. 1.

Referring to the preceding embodiment, the biometric unit 102*b* may comprise one or more biometric parameter acquisition means such as, but not restricted to a microphone (may be arranged to receive an audio sample of user) a fingerprint scanner (may be arranged to receive a fingerprint of user), a camera (may be arranged to receive a facial feature of the user), electrocardiogram (ECG) identifier and other known variants thereof. Moreover, wearable computer (such as smart watch or smart band) can be used for an authorized individual to monitor their heartbeat for the AI to detect unique rhythms, patterns, behaviours and leveraging historical data built over time and also human sweat or other means of confirming DNA. However, the biometric unit 102*b* may exemplary be modified or ameliorated or enhanced or consolidated to configure or integrate a plurality of biometric sensors may be selected from an IRIS recognition sensor, a fingerprint sensor, a temperature sensor, a weight sensor, electroencephalography (EEG) signal via Brain computer Interface and other known examples thereof. In an embodiment, the USB security device 102 may be arranged store biometric information of authenticated user. It would be appreciated that USB security device 102 may receive or update details related to biometric information of authenticated user. Such biometric information can be acquired from user or third-party service provider or first cloud server 106. The pre-stored biometric information of authenticated user can be compared with received biometric parameter to verify authentication of the user. If the user is authenticated, the computing device 104 may allow access of data or various other functionality of system 100. If user is unauthenticated, the computing device 104 and/or USB security device 102 may disable data access and/or destruct information (e.g., pre-stored biometric data, cryptographic key, and authentication PIN etc.). Further, the computing device 104 and/or USB security device 102 may trigger notification to indicate status of authentication. Further, computing device 104 and/or USB security device 102 may be configured to regenerate the cryptographic key. The regeneration of cryptographic key can be executed upon receipt of activation command (from system administrator or user) or successful authentication.

In an exemplary implementation, the (USB) security device 102 may comprise a GPS sensor, which provides location information where (USB) security device 102 is present or location at which (USB) security device 102 is connected with computing device 104. Thus, location information would also enable tracking of safe usage of USB device 102.

In another embodiment, the (USB) security device 102 and/or computing device 104 may comprise a list of safe locations, at which the (USB) security device 102 may be used. Further, the safe location may be associated with a buffer distance (e.g., pre-set distance from safe location). If the determined location of (USB) security device 102 and/or computing device 104 is beyond the buffer distance, (USB) security device 102 and/or is considered as present in unsafe location and notification is triggered by (USB) security device 102.

If the determined current location is outside the pre-set threshold distance from safe location, (USB) security device 102 and/or computing device 104 may disable usage of (a) the (USB) security device 102, and/or (b) stored information such as encryption key, biometric data, PIN etc. Further, the (USB) security device 102 and/or computing device 104 may trigger a notification (to owner/network administrator/relevant party) to indicate that USB device 102 is not present within safe location. Thus, location based monitoring of the (USB) security device 102 may improve security aspect of present disclosure. The primary cryptographic key can be stored in cloud computing platform with security arrangements to prevent a foreign adversary getting physical access to a lost or stolen key and then reverse engineer the firmware, hardware and or extraction of the cryptographic key. The foreign adversary threat can be mitigated by utilizing, a temporary key that will live on the USB device and/or a temporary key is used upon a secure multifactor authentication, authorization and accounting (AAA).

Still referring to the preceding embodiment, the identifier (ID) of the USB security device 102 can be an identification code or an identifier may be employed in recognition thereof. For instance, the ID of the USB security device 102 may relate to, but not limited to a USB ID, a human interface descriptor, a mass storage descriptor, a vendor ID, a product ID and other known examples thereof. Similarly, the cryptographic key can be construed as a string of characters arranged (may be in an order) to encrypt (such as scrambled) one or more critical information relevant to a motive and objective of deploying system 100. An encryption algorithm (such as, not limited to an advanced encryption standard, blowfish, ECC and the like) may be employed to generate a cryptographic key, wherein the cryptographic key may deter or prevent an illicit access to encrypted information.

In an embodiment, a personal identification number (PIN) detection circuit can be arranged to receive an authentication PIN. For instance, the term "authentication pin" as used herein, can relate to, but not limited to a relatively short (such as 4-8 digits and the like) or long numeric or alpha-numeric string (which may or may not comprises a special characters and/or space) or a pass code which can enable an authentication of a user. A person ordinarily skilled in art may prefer that one or more authentication pin data of one or more authenticated user may be stored in the storage device 102*a* for any duration and can be accessed and modified as and when necessary, in accordance with the embodiments of present disclosure. The PIN detection circuit may exemplary detect a pattern or an order of numerals (such as, not restricted to without special characters or alphabets or space and the like) to qualify as an authentication PIN.

In an embodiment, the first cloud server 106 can be communicably coupled with the first computing device over the network interface 110 and arranged to perform one or more functional operation associated with one or more objective of deploying system 100. For instance, an exemplary first control unit may be configured with the first cloud server 106 to perform one or more functional operation which may include, not limited to a reception of the ID associated with USB security device 102, the cryptographic key, the authentication PIN and a pre-stored data (such as, but not limited to a video stream, pictures, text documents, word processing documents, web-based content, instant messages, biometric parameter and other known forms of data that when in a plain text, or clear form, may reveal confidential and sensitive information). The prestored data can be stored/archived at the USB security device 102 or computing device 104. Further, the first cloud server 106 may perform encryption of the received pre-stored data using the received cryptographic key, and transmission of the received ID, cryptographic key and authentication PIN to a second cloud server 108 over the network interface 110 and other known examples thereof.

In an embodiment, the first cloud server 106 may be configured to destroy the cryptographic key, when the received pre-stored data is encrypted. Similarly, the first cloud server 106 can be configured to destroy the cryptographic key upon categorizing the user as unauthenticated. For instance, the exemplary first control unit of the first cloud server 106 may compare one or more received biometric parameter information with one or more pre-stored biometric credential to categorize the user as unauthenticated which can cause or trigger a destruction of cryptographic key. Alternatively, destruction of the cryptographic can be enabled upon command from user or system administrator.

One or more received data may be arranged in a secured database, stored in an exemplary non-transitory storage device which can be searchable/accessible or modified by a security administrator/user of the system 100 and the like. For instance, a first secured database and a second secured database may be arranged with the first cloud server 106 and the second cloud server 108, respectively. In one embodiment, a limited search capability may also be provided to the user. For example, the user may have lost some data/information and can be enabled to recover the data in either the first or second or both secured database.

Referring to the preceding embodiment, one or more received information may be organized in a plurality of rows and columns, wherein each of the information may be tagged or labelled and may be classified (such as a time-stamp, a size, a name and the like). A person ordinarily skilled in art may prefer that one or more received information stored in the first secured database and the second secured database may be navigable/separable, may be through entering a keyword or implementing a radio filter or toggle filter from a rest of information stored therein.

Referring to an epitome of preceding embodiment, an exemplary first control unit may be configured with the first cloud server 106 and the second control unit may be configured with the second cloud server 108. The term "control unit" as used herein may be construed as, but non-restrictively as a decision making unit, an administrator unit or a logical unit and the like. Further, first and the second control unit may be enabled with wired (e.g., bus) or wireless (e.g., WIFI) data communication means, which may include a path/channel to enable a communication among one or more functional embodiments of the control unit. For instance, one or more processor or microprocessor or microcontroller, a non-transitory memory or storage device deployed therein. The control unit may be enabled with a processing module or engine which may include one or more processor (such as a central processing unit, a graphics processing unit, an accelerated processing unit and the like), one or more microprocessor, and/or another type of processing component (such as a field-programmable gate array ("FPGA"), an application-specific integrated circuit ("ASIC"), and the like) that can interpret and/or execute instructions. The non-transitory memory may include a random-access memory ("RAM"), a read only memory ("ROM"), and/or another type of dynamic or static storage device (e.g., a flash, magnetic, or optical memory) that may store information and/or instructions for an execution by the processor.

According to an embodiment, the key will can have a security feature to restore and or recover using multiple secret words or patterns, for an instance, 12 to 15 secret words. Non-limiting examples of the secret words can be any or a combination of alphabets, wild characters, numbers, special characters. The secret words can be initiated during the initial configuration. Like backup codes which will need to be securely stored in a safe. However, user authentication is required to access any data on the USB Key.

Figure 2:
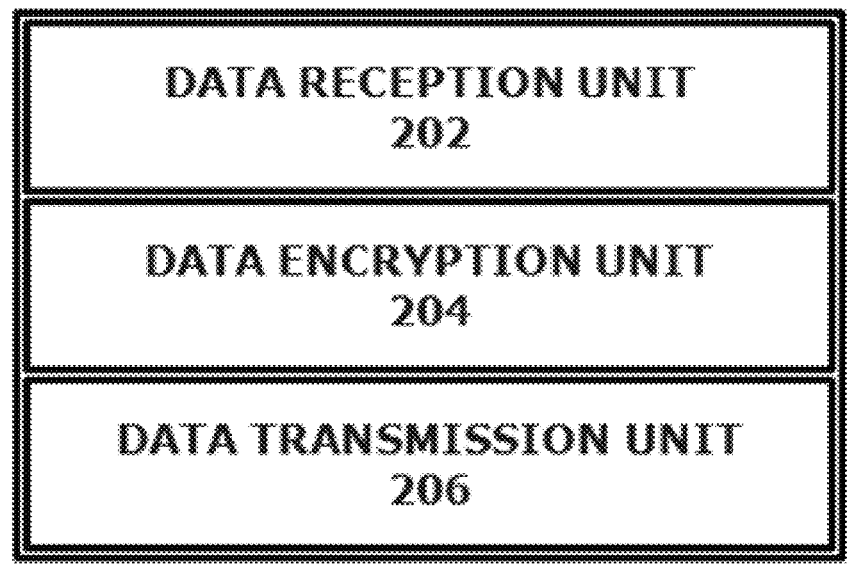
FIG. 2 illustrates an architectural arrangement of one or more functional unit, which can be executed collectively or selectively by one or more processors of the exemplary control unit associated or arranged with the first cloud server, in accordance with the embodiments of present disclosure.

According to an illustration made in FIG. 2, may portray an architectural arrangement 200 of one or more functional unit, which can be executed collectively or selectively by one or more processors of the exemplary control unit associated or arranged with the first cloud server 106, in accordance with the embodiments of present disclosure. The architecture 200 may comprise a data reception unit 202, a data encryption unit 204, a data transmission unit 206, and other known elements thereof. One or more executable routines may be stored in an exemplary memory unit/storage device (may be configured with the first cloud server 106 wherein each of the executable routine, may include one or more functional unit as mentioned herein.

In an embodiment, the data reception unit 202 may be arranged to receive/acquire one or more data (such as the ID, the cryptographic key, the authentication PIN, a pre-stored data and the like) from the computing device 104 or USB security device 102, can be over the network interface 110. To those ordinarily skilled in art may prefer that one or more received information may be stored for any duration in the exemplary memory unit/storage device configured with the first cloud server 106 and may be accessed, modified and updated as and when necessary, in accordance with the embodiments of present disclosure.

In an embodiment, the data encryption unit 204 may be arranged to encrypt the received pre-stored data using the received cryptographic key. For instance, an implementation of the received cryptographic key/encryption key may transform a plaintext (a non-encrypted or unprotected data) of the pre-stored data into a cipher text (an encrypted or protected data), wherein the transformation may be referred to as encryption of the pre-stored data. The received cryptographic key and the plain text may be subjected to an encryption algorithm (such as blowfish, ECC encryption algorithm) for an acquisition of encrypted output of received pre-stored data, in accordance with the embodiments of present disclosure.

In an embodiment, the data transmission unit 206 may be executed by the exemplary first control unit associated with the first cloud server 106 to transmit the ID, the cryptographic key and the authentication PIN, to a second cloud server 108, wherein the second cloud server 108 can be operatively coupled with the first cloud server 106 over the network interface 110. For instance, one or more information may be transmitted via an exemplary data transceiver configured with the first cloud server 106, whereby the second cloud server 108 can be alerted in form a notification (such as an acoustic or light signal or a combination thereof) on a reception thereof.

Figure 3:
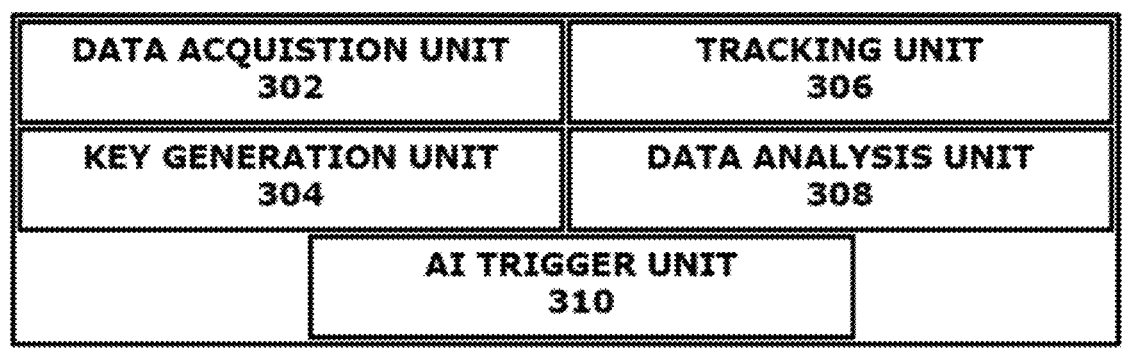
FIG. 3 represents an architectural arrangement of one or more functional unit, which can be executed collectively or selectively by one or more processors of the exemplary second control unit associated or arranged with the second cloud server, in accordance with the embodiments of present disclosure.

According to an illustration made in FIG. 3, may portray an architectural arrangement 300 of one or more functional unit, which can be executed collectively or selectively by one or more processors of the exemplary second control unit associated or arranged with the second cloud server 108, in accordance with the embodiments of present disclosure. The architecture 300 may comprise a data acquisition unit 302, a key generation unit 304, a tracking unit 306, a data analysis unit 308, AI trigger unit 310 and other known elements thereof. One or more executable routines may be stored in an exemplary memory device (may be configured with the second cloud server 108 wherein each of the executable routine, may include one or more functional unit as mentioned herein.

In an embodiment, the data acquisition unit 302 may be arranged to receive the transmitted ID, the cryptographic key and the authentication PIN either from the first cloud server 106, the computing device 104 or USB device 102, over the network interface 110. To those ordinarily skilled in art may prefer that one or more received information (transmitted ID, the cryptographic key and the like) may be stored for any duration in the exemplary memory device configured with the second cloud server 108 and may be accessed, modified and updated as and when necessary, in accordance with the embodiments of present disclosure.

In an embodiment, the key generation unit 304 may be executed to generate a dynamic encryption key. For instance, a dynamic encryption algorithm may be implemented to generate a dynamic encryption key, whereby a dynamic encryption mechanism or paradigm may be altered (such as mutated) during a course of encryption. The term "dynamic encryption" as used herein may relate to, but not restricted to an inner encryption algorithm (such as AES-256 and the like) can be wrapped by an outer dynamic encryption algorithm. The dynamic encryption algorithm may deter a use of a master key for data inspection/breach/decryption. Further the dynamic encryption mechanism may protect against a crypto analysis (such as encryption breach or code breaking).

In an embodiment, the tracking unit 306 may be arranged to utilize, a block chain network to link, the generated dynamic encryption key to the received encrypted data to enable tracking of the encrypted data. The term "block chain network" as used herein may relate, but not limited to a shared/distributed ledger (such as a block chain network may comprise one or more distributed user or nodes configured therein) of the encrypted data/data which may be batched or ramified into one or more blocks, verified, through a consensus mechanism and can be subsequently accepted as a part thereof. Since each block of encrypted data may include generated dynamic encryption key as compared to a previous block, and thus can be inextricably linked together via the block chain network and enable a tracking thereof.

In an embodiment, the data analysis unit 308 may be arranged to analyse, the linked encrypted data to determine at least one Indicator of compromise (IOC). The term "indicator of compromise" as used herein may relate to, but not limited an indicator which may suggest one or more malicious activity or a data breach, unusual traffic, unknown files/applications, dubious activity (e.g., irregular traffic from countries where an organization doesn't have client or business), suspicious log-ins or password reset request, tampered file, suspicious registry or system file changes, large file with unstructured data, system configuration change setting request and any other kind of intrusions related activity on a host system or network. For instance, the malicious activity can cause harm to one or more software or hardware or encrypted data associated with the system 100. One or more malicious activities may include, but not limited to an unauthorized access or subsequent unpermitted use of network interface 110 or the block chain network and encrypted data. The exemplary second control unit may execute the data analysis unit 308 to search for a pattern of behaviour which may be abnormal/anomalous or otherwise vary from an expected use pattern of a particular entity, such as one or more users, an IP address, node or group of nodes in the block chain network, a malware detection, an intrusion detection, an unauthorized access or unauthorized use of data and the like. The second cloud server 108 can be configured to destroy the dynamic encryption key, when at least one IOC may be determined. For example, upon detection of malware attack the second cloud server 108 may delete/destroy dynamic encryption key, available encrypted or decrypted data, log-in credential, biometric data etc. Further, the second cloud server 108 may be arranged to perform one or more safeguard functions, for an instance, data backup, restore system stetting, deletion or removal of IOC and like that.

The data analysis unit 308 may utilize an artificial intelligence based technological solution (e.g., HMM, SVM, CNN, etc.) to determine event related to IOC.

Referring to the preceding embodiment, the data analysis unit 308 may alternatively employ behavioural analytics can be based on a machine learning, a behaviour modelling, a peer group analysis, a classification, one or more statistical models, a graph analysis and the like. For instance, an implementation of a markovian processing flows, inference, grouping processes, and a risk scoring mechanism to develop a user and entity profiles in order to compare and contrast activities, which may ultimately indicate or reveal or divulge at least one IOC. In an alternate embodiment, the system 100 can include a graphical user interface (GUI) that can create a visualization of the detected IOC (such as anomalies and threats).

In an embodiment, the AI trigger unit 310 may be arranged to trigger, an artificial intelligence (AI) mechanism to perform an automated incident measure management for the encrypted data. For instance, the AI trigger unit 310 may be executed by the exemplary second control unit configured with the second cloud server 108. The second control unit 108 may apply one or more machine learning technique (may be included in the AI mechanism) to perform an automated incident measure management for the encrypted data. To those skilled in art may prefer a plurality of machine learning technique which can be selectively or preferably applied for the generating one or more automated incident measure management model.

Referring to the preceding embodiment, one or more machine learning technique may be implicated, which can be selected from an artificial neural network (ANN), a Linear Regression, Gaussian Process, Ensemble Boosting Tree with Ada Boost, Ensemble Boosted Tree, support vector machine (SVM) and Ensemble Bagging Tree with Random Forest and other known examples thereof.

Referring to the preceding embodiment, a machine learning algorithm may find a relationship or data pattern, develop an understanding, make one or more reactive measures (e.g., containment, eradication, recover etc.), proactive measures (learning, prepare security protocol to prevent such event) and can develop a confidence.

Figure 4:
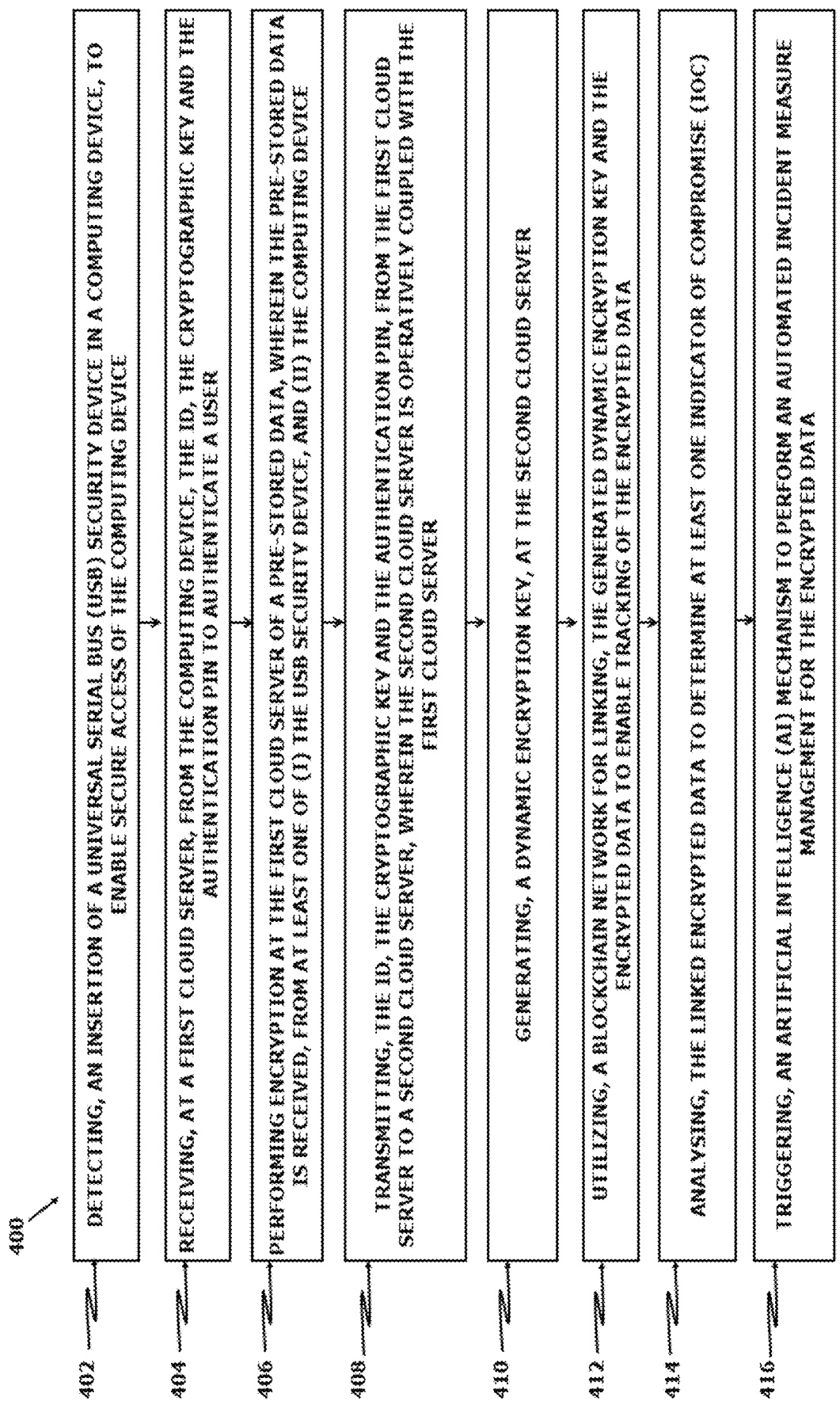
FIG. 4 illustrates exemplarily steps for managing security of a cycler security platform, in accordance with embodiments of the present disclosure.

FIG. 4 illustrates exemplarily steps for managing security of a cycler security platform, in accordance with embodiments of the present disclosure. As illustrated in flow diagram 400, at step (402), detecting, an insertion of a Universal Serial Bus (USB) security device in a computing device, to enable secure access of the computing device, wherein the USB security device comprises: a storage device, which is arranged to store: an identifier (ID) of the USB security device, a cryptographic key, and a personal identification number (PIN) detection circuit is arranged to receive an authentication PIN.

At step (404), receiving, at a first cloud server, from the computing device, the ID, the cryptographic key and the authentication PIN to authenticate a user, and at step (406), performing encryption at the first cloud server of a pre-stored data, wherein the pre-stored data is received, from at least one of (i) the USB security device, and (ii) the computing device.

At step (408), transmitting, the ID, the cryptographic key and the authentication PIN, from the first cloud server to a second cloud server, wherein the second cloud server is operatively coupled with the first cloud server, at step (410), generating, a dynamic encryption key, at the second cloud server.

Further, at step (412), utilizing, a blockchain network for linking, the generated dynamic encryption key and the encrypted data to enable tracking of the encrypted data, at step (414), analysing, the linked encrypted data to determine at least one Indicator of compromise (IOC), and at step (416), triggering, an artificial intelligence (AI) mechanism to perform an automated incident measure management for the encrypted data.

The term "first," or "second," and so forth may be used during the course of present disclosure, as and when necessary, may not be restricted to a descriptive portrayal of a temporal or a physical association or relation of one or more components (such as the term "first" may be used as a label or an identifier to separate or discern an understanding of a plurality of functional elements and sub elements of the system 100, from each other).

In an exemplary embodiment, the network interface 110 can be arranged to functionally or operationally interlink the elements of the system 100, with each other. Non-limiting examples of network interface 110 may include a short-range network interface 110 and/or long-range network interface 110. The short-range network interface 110 may include Wi-Fi, Bluetooth low energy (BLE), Zigbee, and the like. The long-range network interface 110 may include Local Area Network (LAN), Metropolitan Area Network (MAN), Wide Area Network (WAN), a cloud computing platform, a data centre, Internet of Things (IoT), light fidelity (LiFi) and the like. The embodiments of proposed disclosure, may work well with any or a combination of aforementioned networks. The network interface 110 may incorporate any or a combination of wired or wireless communication mechanisms that can be performed through various computer networking protocols. The computer networking protocol may include Asynchronous Transfer Mode (ATM), Transmission Control Protocol/Internet Protocol (TCP/IP), Ethernet management, Simple Mail Transfer Protocol (SMTP); and security, such as Secure Shell (SSH), Hypertext Transfer Protocol (HTTP), File Transfer Protocol (FTP) and User Datagram Protocol (UDP). Moreover, any other suitable protocols using voice, video, data, or combinations thereof, can also be employed.

Example embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including hardware, software, firmware, and a combination thereof. For example, in one embodiment, each block of the block diagrams and flowchart illustrations, and combinations of blocks in the block diagrams and flowchart illustrations can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Throughout the present disclosure, the term 'processing means' or 'microprocessor' or 'processor' or 'processors' includes, but is not limited to, a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

The term "non-transitory storage device" or "storage" or "memory," as used herein relates to a random access memory, read only memory and variants thereof, in which a computer can store data or software for any duration.

Operations in accordance with a variety of aspects of the disclosure is described above would not have to be performed in the precise order described. Rather, various steps can be handled in reverse order or simultaneously or not at all.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

I claim:

1. A system to manage security, the system comprising:
   a Universal Serial Bus (USB) security device is arranged to enable secure access of a computing device, wherein the USB security device comprises:
      a storage device, which is arranged to store:
         (i) an identifier (ID) of the USB security device,
         (ii) a cryptographic key, and
         (iii) a personal identification number (PIN) detection circuit is arranged to receive an authentication PIN;
   a first cloud server is communicably coupled with the first computing device, wherein the first cloud server is arranged to:
      utilize a network interface to receive the ID, the cryptographic key, the authentication PIN and a pre-stored data, wherein the pre-stored data is stored in at least one of (i) the USB security device, and (ii) the computing device;
      encrypt the received pre-stored data using the received cryptographic key; and
      transmit the ID, the cryptographic key and the authentication PIN, to a second cloud server, wherein the second cloud server is operatively coupled with the first cloud server; and
   the second cloud server is arranged to:
      receive the transmitted ID, the cryptographic key and the authentication PIN;
      generate a dynamic encryption key;
      utilize, a blockchain network to link, the generated dynamic encryption key to the encrypted data to enable tracking of the encrypted data;
      analyse, the linked encrypted data to determine at least one Indicator of compromise (IOC); and
      trigger, an artificial intelligence (AI) mechanism to perform an automated incident measure management for the encrypted data.

2. The system of claim 1, wherein the USB security device comprising a biometric unit to receive a biometric parameter of a user for authentication.

3. The system of claim 2, wherein the biometric unit comprising at least one from:
   a microphone to receive an audio sample of user;
   a fingerprint scanner to receive a fingerprint of user; and
   a camera to receive a facial feature of the user.

4. The system of claim 2, wherein the received biometric parameter are used to authenticate the user to regenerate the cryptographic key.

5. The system of claim 2, wherein the USB security device is arranged store biometric information of authenticated user.

6. The system of claim 1, wherein the first cloud server is configured to destroy the cryptographic key, when the received pre-stored data is encrypted.

7. The system of claim 1, wherein the first cloud server is configured to destroy the cryptographic key upon categorizing the user as unauthenticated.

8. The system of claim 1, wherein the second cloud server is configured to destroy the dynamic encryption key, when the at least one IOC is determined.

9. The system of claim 1, wherein the USB security device is arranged to store a secondary key to regenerate the cryptographic key.

10. The system of claim 1, wherein the encryption key is destroyed, by the USB device, upon determining the USB device is beyond a safe location.

11. The system of claim 1, wherein a notification is triggered, by the USB device, upon determining the USB is beyond a pre-set threshold distance from the safe location.

12. The system of claim 1, wherein the USB security device comprises a smart card reader to receive an authentication data from a smart card.

13. A method for managing security, the method comprising:

detecting, an insertion of a Universal Serial Bus (USB) security device in a computing device, to enable secure access of the computing device, wherein the USB security device comprises:

a storage device, which is arranged to store:

(i) an identifier (ID) of the USB security device, (ii) a cryptographic key, and (iii) a personal identification number (PIN) detection circuit is arranged to receive an authentication PIN;

receiving, at a first cloud server, from the computing device, the ID, the cryptographic key and the authentication PIN to authenticate a user;

performing encryption at the first cloud server of a pre-stored data, wherein the pre-stored data is received, from at least one of (i) the USB security device, and (ii) the computing device;

transmitting, the ID, the cryptographic key and the authentication PIN, from the first cloud server to a second cloud server, wherein the second cloud server is operatively coupled with the first cloud server;

generating, a dynamic encryption key, at the second cloud server;

utilizing, a blockchain network for linking, the generated dynamic encryption key and the encrypted data to enable tracking of the encrypted data;

analysing, the linked encrypted data to determine at least one Indicator of compromise (IOC); and triggering, an artificial intelligence (AI) mechanism to perform an automated incident measure management for the encrypted data.

14. The method of claim 13, wherein the USB security device comprising a biometric unit to receive a biometric parameter of a user for authentication.

15. The method of claim 13, wherein the first cloud server is configured to destroy the cryptographic key, when the received pre-stored data is encrypted.

16. The method of claim 13, wherein the first cloud server is configured to destroy the cryptographic key upon categorizing the user as unauthenticated.

17. The method of claim 13, wherein the second cloud server is configured to destroy the dynamic encryption key, when the at least one IOC is determined.

18. The method of claim 13, wherein the USB security device is arranged to store a secondary key to regenerate the cryptographic key.

19. A non-transitory computer-readable storage medium, comprising executable instructions that, when executed by a processing system including a processor, facilitate security management, comprising:

detecting, an insertion of a Universal Serial Bus (USB) security device in a computing device, to enable secure access of the computing device, wherein the USB security device comprises:

a storage device, which is arranged to store:

(i) an identifier (ID) of the USB security device, (ii) a cryptographic key, and (iii) a personal identification number (PIN) detection circuit is arranged to receive an authentication PIN; and receiving, at a first cloud server, from the computing device, the ID, the cryptographic key and the authentication PIN to authenticate a user;

performing encryption at the first cloud server of a pre-stored data, wherein the pre-stored data is received, from at least one of (i) the USB security device, and (ii) the computing device;

transmitting, the ID, the cryptographic key and the authentication PIN, from the first cloud server to a second cloud server, wherein the second cloud server is operatively coupled with the first cloud server;

generating, a dynamic encryption key, at the second cloud server;

utilizing, a blockchain network for linking, the generated dynamic encryption key and the encrypted data to enable tracking of the encrypted data;

analysing, the linked encrypted data to determine at least one Indicator of compromise (IOC); and triggering, an artificial intelligence (AI) mechanism to perform an automated incident measure management for the encrypted data.

\* \* \* \* \*